Patented Nov. 21, 1950

2,530,923

UNITED STATES PATENT OFFICE 2,530,923

OXIDATION OF OLEFINIC FATTY ACIDS AND ESTERS THEREOF

Amos Turk, Brooklyn, N. Y., and Paul D. Boone, Washington, D. C.

No Drawing. Application August 10, 1946, Serial No. 689,831

12 Claims. (Cl. 260—406)

This invention relates to a process for the production of oxidized compounds from liquid monoenic- or polyenic compounds.

It is an object of our invention to provide an economical process of reacting upon unsaturated long chain fatty acids or the amides or the esters of such acids, as for example the glycerol esters or other esters of polyhydric alcohols, such as polyglycerol, erythritol, pentaerythritol, dipentaerythritol, mannitol or sorbitol, whereby a hydroxyl group or a ketone group is introduced by oxidation without attacking the olefine group or groups. By the term "long chain" herein is meant twelve or more, preferably at least sixteen carbon atoms.

More particularly it is an object of our invention to provide an economical method whereby the hydroxyl group or the ketone group is introduced onto a carbon atom in an unsaturated fatty molecule in the alpha position to a carbon to carbon double bond. The liquid hydroxylated product is an unsaturated secondary alcohol. The liquid ketone product is an unsaturated ketone.

In the Amos Turk Patent #2,469,059 "Oxidized Olefine Liquids" there is described a method for preparing these olefine secondary alcohols by using about one-half mole of $SeO_2$ to a mole of the unsaturated fatty acid or its ester. But this is expensive because of the cost of the $SeO_2$. Moreover the red color from such large amounts of this oxidizing agent is difficult to remove.

Briefly stated, the above objects of the present invention are accomplished by subjecting the non-conjugated liquid fatty mono-olefine or polyolefine compounds, which are acids, amides or esters, to oxidation by contacting said liquid compounds by oxygen, or a gas containing oxygen in the free state such as air, while heating said liquid compound or maintaining it in a heated condition, and while in the presence of catalytic amounts of selenium, tellurium, selenides, tellurides, or other derivatives of Se or Te such as their oxides or organic derivatives. In this manner the —$CH_2$— group adjacent the olefine carbon linkage is oxidized to

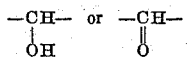

By the mechanism of the reaction there is first formed the alkylol group which by further oxidation is converted into the ketone group.

The course of this reaction may be explained as follows:

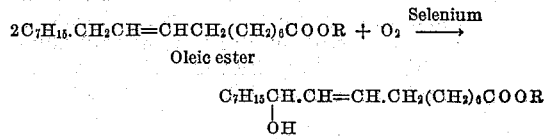

where R represents the glycerol nucleus.

In the case of linoleic acid (employing the structural formula on page 354, vol. I of Richter's Organic Chemistry, 3rd edition by Allott) this may be represented as follows wherein the unsaturated ketone is formed:

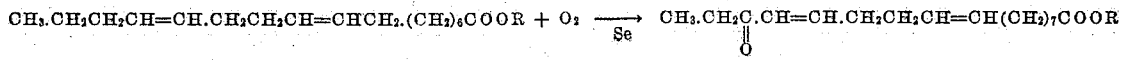

In both of these reactions however some other $CH_2$ group adjacent a $CH=CH$ group than that shown may in fact be oxidized. Linolenic acid, a triolefinecarboxylic acid and clupanodonic acid and their ester or other polyolefinic, long chain acyl derivatives may be oxidized in the same way. In all these carboxylic acids and their esters the resulting oxidized products have a hydroxyl or a ketone group in the alpha position with respect to carbon atoms united by the olefine bonds.

The process, because the oxygen is not derived from that in a compound with selenium such as $SeO_2$, but from a gas injected into the unsaturated carboxylic acid or its derivatives, or released in situ, is easier to control and much cheaper and has other obvious benefits. Of course if $SeO_2$ is the initial catalyst then a minor proportion of $O_2$ would effectively be generated in situ. But the reaction to form the olefine secondary alcohol or the ketone does not depend upon this small release of oxygen.

The oxidation can be carried out by heating the oily olefine liquid in the presence of the catalyst while bringing the mixture into extended surface contact with free gaseous oxygen, either in the absence or the presence of a mutual solvent.

The catalyst should be removed. This can be done in several ways. Filter aids prove of assistance usually. Aqueous solutions of alum or other electrolytes can be used.

The red color of the treated oil or higher fatty acid may be removed as disclosed in the Harper U. S. Patent #2,152,642 by mixture of 90% amyl and 10% ethyl alcohol in equal volume to the oil. In the case of the higher fatty acid, the acid may be distilled under high vacuum whereby the red coloration is left in the residue. It can also be removed as described in U. S. Patent No. 2,165,530, or by adsorbents such as activated alumina.

Catalytic proportions only of Se, Te, their selenides or tellurides or other derivatives of selenium or tellurim, such as their oxides or organic derivatives should be used, because removal of an excess of solid residual materials is a mechanical problem. An amount above 10 per cent based on the weight of the oil should not be used, and amounts of 5–1 per cent or less are suitable and preferred.

Suitable temperatures are 80° C.–225° C., but it is preferred to employ a temperature af about 150° C. Temperatures above 200° C. tend to polymerize the fatty olefine. The liquid should not be cracked because of the application of excess heat. A large surface exposure of the fatty oil or its derivatives should be provided for, such as attained by constant stirring, by diffusion tubes which sub-divide the gas bubbles or spraying devices. In this way oils are secured which contain a high theoretical per cent of alcohol hydroxyl content or ketone, and which have low acid numbers, viscosities and color indices. The glyceride linkages and the olefine linkages are not disturbed.

The starting materials used in our invention, are liquid unsaturated long chain carboxylic acids and their esters whether obtained from natural sources or synthetically, and also any other liquid monoenic or polyenic compounds contained in or derived from naturally occurring oils and fatty substances or artificially synthesized, which contain twelve or more carbon atoms in the acyl nucleus. Those containing at least sixteen and not more than thirty-two carbon atoms are preferred. These materials may be either individual compounds in a state of high purity or else mixtures which contain various mono- or polyene compounds, such as the mixtures found in nature. Such unsaturated compounds are in fact abundantly found in natural substances, and make up important animal and vegetable oils. These oils include such materials derived from nature as linseed oil, soy bean oil, perilla oil, sunflower oil, safflower oil, olive oil, and various suitable marine oils such as sardine, menhaden, pilchard and whale oils. Various members of the semi-drying oil class per se or freed in part or in toto from saturates may be used. The unsaturated fatty acids thereof (either with or without fractionation) or equivalent artificial acids can also be used.

The hydroxylated unsaturated fatty acids and their esters or their amides of this invention differ structurally from ricinoleic acid and from air or permanganate oxidized oleostearic acid, -linoleic acid or -linolenic acid. In ricinoleic acid the hydroxyl group is beta to an olefine carbon atom, as shown by the formula

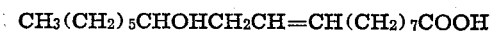
CH$_3$(CH$_2$)$_5$CHOHCH$_2$CH=CH(CH$_2$)$_7$COOH

We shall describe our invention in more specific detail in the following examples. There are, of course, many forms of the invention other than these specific embodiments.

*Example 1*

100 parts of alkali refined linseed oil and 2 parts of powdered selenium metal were heated to a temperature of 150° C. Oxygen gas was introduced into this mixture, with effective agitation using a tube with very small openings to subdivide the gas, for a period of about four hours. At the end of this time a mixture of hydroxylated and other oxygenated linseed oils was formed. This was decanted from the metallic selenium.

*Example 2*

The catalyst was prepared in the following manner: An intimate mixture of activated silica and selenium dioxide was prepared by wetting 5 parts of the silica with 1 part of the selenium dioxide dissolved in ethyl alcohol. After drying to remove the alcohol, only the silica and selenium dioxide, in intimate mixture, remain. This silica-selenium dioxide catalyst was mixed with 100 parts of linseed oil and the entire mixture was heated to about 150° C. At this temperature the selenium dioxide reacted with the oil and was reduced to metallic selenium:

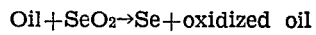
Oil+SeO$_2$→Se+oxidized oil

The metallic selenium catalyst supported on silica, prepared in this manner in the medium of the oil whose oxidation is to be catalyzed, is a very effective catalyst. Oxygen gas or air is then introduced into the mixture; and the catalytic oxidation step is then carried out as described in the previous example.

*Example 3*

The procedure of Example 1 is followed, in which the catalyst is instead a metallic selenite, such as silver selenite, cadmium selenite, sodium selenite, or lead selenite.

*Example 4*

The procedure of Example 1 is followed, in which the catalyst is instead a metallic tellurite, such as silver tellurite, cadmium tellurite, sodium tellurite or lead tellurite.

These olefine hydroxylated liquid products have many uses, some of which are set out below, but one of their paramount uses is to provide materials which upon dehydration yield conjugated polyene compounds, which are substitutes or replacements for dehydrated castor oil and China-wood oil (tung oil). This can be done by any of the conventional dehydration processes conventionally employed to split off water from castor oils or from glycols.

The formation of conjugated oils from this type of secondary alcohol whose OH group is on a carbon atom alpha to an olefine double bond will herewith be described:

This mixture from Example 1 after Se removal and decolorization was dehydrated by heating 100 parts of the oxygenated oil with two parts of activated silica and one-half part of concentrated phosphoric acid until the elimination of water was complete. The material was then filtered. The resulting product showed improved drying properties and evidence of conjugation of double bonds by ultraviolet absorption spectra, Ellis diene number, and exaltation of molecular refraction.

To save one step in the process of producing a hydroxylated fatty oil and then dehydrating, it is possible to carry out the oxidation and dehydration together. This can be done by using a dehydration catalyst as the carrier for the oxidation catalyst, and by providing a means of removing water as it should be formed in the dehydration. Thus in the procedure of Example 2, activated alumina is used as the carrier in place of silica, and water is removed from the mixture by distillation and condensation as it is formed. At the end of the oxidation, the temperature may be raised and the dehydration continued to completion if any water is still being formed. The oil is then separated by filtration from the mixture of alumina and selenium, and shows improved drying properties and evidence of conjugation of double bonds.

There are many uses to which the hydroxylated unsaturated fatty acids and esters thereof, such as the glycerides, produced by the processes, herein disclosed, may be put as such or after conversion to derivatives. The hydroxylated oils or hydrogenated derivatives thereof may be sulfated by sulfuric acid, oleum or treated with other sulfating or sulfonating agents. This type of derivatives can be used for such purposes as mordants in alizarine dyeing, wetting out or emulsifying agents in dyeing and finishing textiles, as a component in cutting oils and in the leather industry for the fat-liquoring of leather.

These sulfonated or sulfated hydroxylated oils or the sulfated blown hydroxylated oils subsequently mentioned or their fatty acids or derivatives thereof may be employed similarly as in the case of castor oil as agents for de-emulsifying petroleum water-in-oil emulsions or in paper making or as cleaning agents or in other places where decrease of surface tension is important such as a splitting agent in oil hydrolysis.

These hydroxylated oils may be used in the manufacture of softeners for cellulose ester lacquers, e. g. artificial leather finishes and airplane dopes. They can also be employed in the manufacture of imitation leathers, dressing for leather belting, sticky fly paper, typewriter inks, and in the case of the mono-enes as lubricants or hydraulic brake fluids in place of castor oil. They can be saponified to yield soaps, for several purposes. In the purified forms they can also be used in pharmacy as a hair oil or massage oil.

Blown derivatives can be made from the hydroxylated olefinic fatty acids or oils of this invention. Acid amides and blown amides of these hydroxylated olefinic fatty acids can be made. Such amides or blown amides can be formed by reacting these acids or their esters with monoethanolamine, diethanolamine, ethanol ethylene diamine, ethylene diamine or other amines or ammonia. The blown oils or other blown derivatives or even the unblown oils can be employed as plasticizers or agents for imparting flexibility more particularly in the cellulose ester finishes, lacquer paste colors, etc.

These hydroxylated unsaturated oils or the acids thereof may be acylated or peracylated. Esterification can be carried out with monobasic organic acids or polybasic acids such as phthalic, maleic or citric acids.

Resins of the glyptal type may be made from these hydroxylated unsaturated oils or their acids in conjunction with the conventional polycarboxylic acid and conventional polyhydric alcohols.

Oxyethylated derivatives of the hydroxylated unsaturated acids of this invention may be made using 3-12 mols of ethylene oxide per mol of the said acid employing a small amount of sodium soap.

The hydroxylated unsaturated acids of this invention can be split by fusion or strenuous heating with strong alkali to secure a shorter chain carboxylic acid and a shorter chain hydroxy carboxylic acid, as is the case with castor oil. Pyrolysis of the sodium soaps of these hydroxylated unsaturated fatty acids yields a shorter chain secondary alcohol and a mixed ketone.

These chemically dehydrated oils, amides or unsaturated carboxylic acids which possess the conjugated olefine structure can be again oxidized by air or oxygen in the presence of the catalyst as described more in detail supra. Likewise the dehydration product from this in turn can be oxidized in the same manner. These multi-oxidized products, however, are mono-hydroxyl conjugated polyenes, wherein the olefine linkage is in the alpha position with respect to the carbon on which OH is linked. In fact, by extension of this process a conjugated triene or tetraene containing a mono-hydroxyl group can be attained.

While we have in the foregoing described in some detail the preferred embodiment of our invention and some variants thereof, it will be understood that this is only for the purpose of making the invention clearer and that the invention is not to be limited to the details of operation described. On the other hand, the invention is to be regarded as limited only by the terms of the accompanying claims.

We claim:

1. In the process of producing oxidized liquid compounds containing an olefine linkage and a member from the group consisting of an alcoholic hydroxyl and ketone, the steps of intimately contacting a gas containing oxygen in the free state with a heated oily liquid of a member of the group consisting of a long chain unsaturated carboxylic acid and its polyhydric esters in the presence of a member of the group consisting of Se, Te and their compounds in not over 10% by weight of said liquid at a temperature below the cracking temperature of the liquid, until a $CH_2$ group adjacent an olefine linked carbon atom is oxidized to that state wherein it contains a member from the group consisting of an alcoholic hydroxyl and ketone, and thereafter removing the metallic residue and much of its complexes from the oily liquid.

2. In the process of producing oxidized liquid compounds containing an olefine linkage and a member from the group consisting of an alcoholic hydroxyl and ketone, the steps of intimately contacting a gas containing oxygen in the free state with a heated oily liquid of a member of the group consisting of a long chain unsaturated carboxylic acid and its polyhydric esters in the presence of a member of the group consisting of Se, Te and their compounds in not over 10% by weight of said liquid, while at a temperature not below substantially 80° C. nor up to the cracking temperature, until a $CH_2$ group adjacent an olefine linked carbon atom is oxidized to that state wherein it contains a member from the group consisting of an alcoholic hydroxyl and ketone, and thereafter removing the metallic residue and much of its complexes from the oily liquid.

3. In the process of producing oxidized liquid compounds containing a polyolefine linkage and a member from the group consisting of an alcoholic hydroxyl and ketone, the steps of intimately contacting a gas containing oxygen in the free state with a heated oily liquid of a member of the group consisting of a long chain polyolefinic carboxylic acid and its polyhydric esters in the presence of a member of the group consisting of Se, Te and their compounds in not over 10% by weight of said liquid at a temperature below the cracking temperature of the liquid, until a $CH_2$ group adjacent an olefine linked carbon atom is oxidized to that state wherein it contains a member from the group consisting of an alcoholic hydroxyl and ketone, and thereafter removing the metallic residue and much of its complexes from the oily liquid.

4. In the process of producing oxidized liquid compounds containing a polyolefine linkage and a member from the group consisting of an alcoholic hydroxyl and ketone, the steps of intimately contacting a gas containing oxygen in the free state with a heated oily liquid of a member of the group consisting of a long chain polyolefinic carboxylic acid and its polyhydric esters in the presence of a member of the group consisting of Se, Te and their compounds in not over 10% by weight of said liquid, while at a temperature not below substantially 80° C. nor up to the cracking temperature, until a $CH_2$ group adjacent an olefine linked carbon atom is oxidized to that state wherein it contains a member from the group consisting of an alcoholic hydroxyl and ketone, and thereafter removing the metallic residue and much of its complexes from the oily liquid.

5. In the process of producing oxidized compounds which are olefinic secondary alcohols the step of intimately contacting a gas containing oxygen in the free state with a heated oily liquid of a member of the group consisting of a long chain unsaturated carboxylic acid and its polyhydric esters in the presence of a member of the group consisting of Se, Te and their compounds in not over 10% by weight of said liquid at a temperature below the cracking temperature of the liquid, until a $CH_2$ group adjacent an olefine linked carbon atom is oxidized to CHOH and thereafter removing the metallic residue and much of its complexes from the oily liquid.

6. In the process of producing oxidized compounds which are olefinic secondary alcohols the step of intimately contacting a gas containing oxygen in the free state with a heated oily liquid of a member of the group consisting of a long chain unsaturated carboxylic acid and its polyhydric esters in the presence of a member of the group consisting of Se, Te and their compounds in not over 10% by weight of said liquid, while at a temperature not below substantially 80° C. nor up to the cracking temperature until a $CH_2$ group adjacent an olefine linked carbon atom is oxidized to CHOH and thereafter removing the metallic residue and much of its complexes from the oily liquid.

7. In the process of producing oxidized compounds which are olefinic ketones the step of intimately contacting a gas containing oxygen in the free state with a heated oily liquid of a member of the group consisting of a long chain unsaturated carboxylic acid and its polyhydric esters in the presence of a member of the group consisting of Se, Te and their compounds in not over 10% by weight of said liquid at a temperature below the cracking temperature of the liquid, until a $CH_2$ group adjacent an olefine linked carbon atom is oxidized to C=O and thereafter removing the metallic residue and much of its complexes from the oily liquid.

8. In the process of producing oxidized compounds which are olefinic ketones the step of intimately contacting a gas containing oxygen in the free state with a heated oily liquid of a member of the group consisting of a long chain unsaturated carboxylic acid and its polyhydric esters in the presence of a member of the group consisting of Se, Te and their compounds in not over 10% by weight of said liquid, while at a temperature not below substantially 80° C. nor up to the cracking temperature, until a $CH_2$ group adjacent an olefine linked carbon atom is oxidized to C=O and thereafter removing the metallic residue and much of its complexes from the oily liquid.

9. The process set out in claim 5 wherein the unsaturated carboxylic and its polyhydric esters are polyolefinic in structure.

10. The process set out in claim 6 wherein the unsaturated carboxylic acid and its polyhydric esters are polyolefinic in structure.

11. The process set out in claim 7 wherein the unsaturated carboxylic acid and its polyhydric esters are polyolefinic in structure.

12. The process set out in claim 8 wherein the unsaturated carboxylic acid and its polyhydric esters are polyolefinic in structure.

AMOS TURK.
PAUL D. BOONE.

REFERENCES CITED

The following references are of record in the file of this patent:

UNITED STATES PATENTS

| Number | Name | Date |
|---|---|---|
| 2,165,530 | Bertram | July 11, 1939 |
| 2,308,152 | Boone | Aug. 20, 1940 |

OTHER REFERENCES

Oil and Fat Products, Bailey, 1945, pp. 698–699.